United States Patent
Fujita (10) Patent No.: US 8,154,623 B2
(45) Date of Patent: Apr. 10, 2012

(54) IMAGE PICKUP APPARATUS AND CONTROL METHOD THEREOF

(75) Inventor: Yusuke Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 487 days.

(21) Appl. No.: 12/337,801

(22) Filed: Dec. 18, 2008

(65) Prior Publication Data

US 2009/0167897 A1   Jul. 2, 2009

(30) Foreign Application Priority Data

Dec. 28, 2007  (JP) ................. 2007-341312

(51) Int. Cl.
*H04N 5/262* (2006.01)
*H04N 5/228* (2006.01)

(52) U.S. Cl. ............... 348/240.1; 340/240.2; 340/240.3; 340/208.6

(58) Field of Classification Search ........... 348/240.1–3, 348/E5.51, E51.055, 208.5–7
See application file for complete search history.

(56) References Cited

U.S. PATENT DOCUMENTS

| 5,420,632 | A | * | 5/1995 | Yamagiwa | 348/240.3 |
|---|---|---|---|---|---|
| 5,867,217 | A | * | 2/1999 | Okino et al. | 348/240.99 |
| 6,947,074 | B2 | | 9/2005 | Koseki et al. | |
| 2006/0152604 | A1 | * | 7/2006 | Ishikawa | 348/240.99 |

FOREIGN PATENT DOCUMENTS

| JP | 06-038085 A | 2/1994 |
|---|---|---|
| JP | 06-165015 A | 6/1994 |
| JP | 06-350891 A | 12/1994 |
| JP | 07-107362 A | 4/1995 |
| JP | 2002-314868 | 10/2002 |

OTHER PUBLICATIONS

The above references were cited in a Feb. 21, 2012 Japanese Office Action, a copy of which is not enclosed, that issued in Japanese Patent Application No. 2007-341312.

* cited by examiner

*Primary Examiner* — Sinh Tran
*Assistant Examiner* — Shahbaz Nazrul
(74) *Attorney, Agent, or Firm* — Cowan, Liebowitz & Latman, P.C.

(57) ABSTRACT

An image pickup apparatus that includes an optical zooming unit, an electronic zooming unit, and a controller, wherein when the optical zooming unit moves from a first zoom region to a second zoom region that is closer to a wide-angle end than the first zoom region, the controller discretely moves the electronic zooming unit along with the operation of the optical zooming unit at the first change rate, and when the optical zooming unit moves from the first zoom region to a third zoom region that is closer to a telephoto end than the first zoom region, the controller discretely operates the electronic zooming unit along with the operation of the optical zooming unit at the second change rate.

5 Claims, 9 Drawing Sheets

IMAGE PICKUP APPARATUS AND CONTROL METHOD THEREOF

BACKGROUND OF THE INVENTION

1. Field of the Invention

The present invention relates to an image pickup apparatus, such as a video camera and a digital still camera, and more particularly to an image pickup apparatus that serves to perform digital zooming along with optical zooming.

2. Description of the Related Art

Some image pickup apparatuses, such as a video camera, have an optical zoom function that varies a magnification by moving a magnification-varying lens in an optical system, and an electronic (or digital) zoom function that provides electronic zooming by using an image generated through a photoelectric conversion of a subject image formed by the optical system. An extremely high zoom magnification can be obtained by using the optical zoom function and the electronic zoom function in combination (see Japanese Laid-Open Patent No. 2002-314868).

However, when the electronic zoom magnification is stepwise changed along with a change of the optical zoom magnification in a rear focus mechanism, a moving amount of a focus lens relative to a zoom lens becomes larger at the telephoto side than at the wide-angle end. Therefore, an image magnification variation ratio (change rate) of the optical system is made smaller at a position closer to the telephoto end by mitigating the moving load of the focus lens. On the other hand, when the image magnification variation by the image magnification variation part which is a change of a magnification by the electronic zooming is discrete, it hardly matches the image magnification variation ratio of the above optical system. Then, as zoom moves from the wide-angle end side to the telephoto end side, a zoom speed or a change rate of a synthesis magnification between the optical zoom magnification and the electronic zoom magnification becomes greatly different between the vicinity of the telephoto end and the vicinity of the wide-angle end. Thereby, a user's comfortable zoom manipulation may be impaired.

SUMMARY OF THE INVENTION

The present invention is directed to an image pickup apparatus that can record a high-quality image, in using the optical/electronic synthesis zoom function, and reduce a difference of the zoom speed between the vicinity of the telephoto end and the vicinity of the wide-angle end.

An image pickup apparatus according to one aspect of the present invention includes an optical zooming unit configured to provide an optical magnification variation by using a rear focus mechanism, an electronic zooming unit configured to provide an electronic magnification variation, and a controller configured to discretely control an operation of the electronic zooming unit along with an operation of the optical zooming unit by using at least a first change rate or a second rate smaller than the first change rate, wherein when the optical zooming unit moves from a first zoom region to a second zoom region that is closer to a wide-angle end than the first zoom region, the controller discretely moves the electronic zooming unit along with the operation of the optical zooming unit at the first change rate, and when the optical zooming unit moves from the first zoom region to a third zoom region that is closer to a telephoto end than the first zoom region, the controller discretely operates the electronic zooming unit along with the operation of the optical zooming unit at the second change rate.

A control method according to another aspect of the present invention for an image pickup apparatus that includes an optical zooming unit configured to provide an optical magnification variation by using a rear focus mechanism, an electronic zooming unit configured to provide an electronic magnification variation, and a controller configured to discretely control an operation of the electronic zooming unit along with an operation of the optical zooming unit by using at least a first change rate and a second rate smaller than the first change rate includes the steps of discretely moving, when the optical zooming unit moves from a first zoom region to a second zoom region that is closer to a wide-angle end than the first zoom region, the electronic zooming unit along with the operation of the optical zooming unit at the first change rate, and discretely operating, when the optical zooming unit moves from the first zoom region to a third zoom region that is closer to a telephoto end than the first zoom region, the electronic zooming unit along with the operation of the optical zooming unit at the second change rate.

Further features of the present invention will become apparent from the following description of exemplary embodiments with reference to the attached drawings.

DESCRIPTION OF THE EMBODIMENTS

Referring now the accompanying drawings, a description will be given of preferred embodiments of the present invention.

First Embodiment

Figure 1:
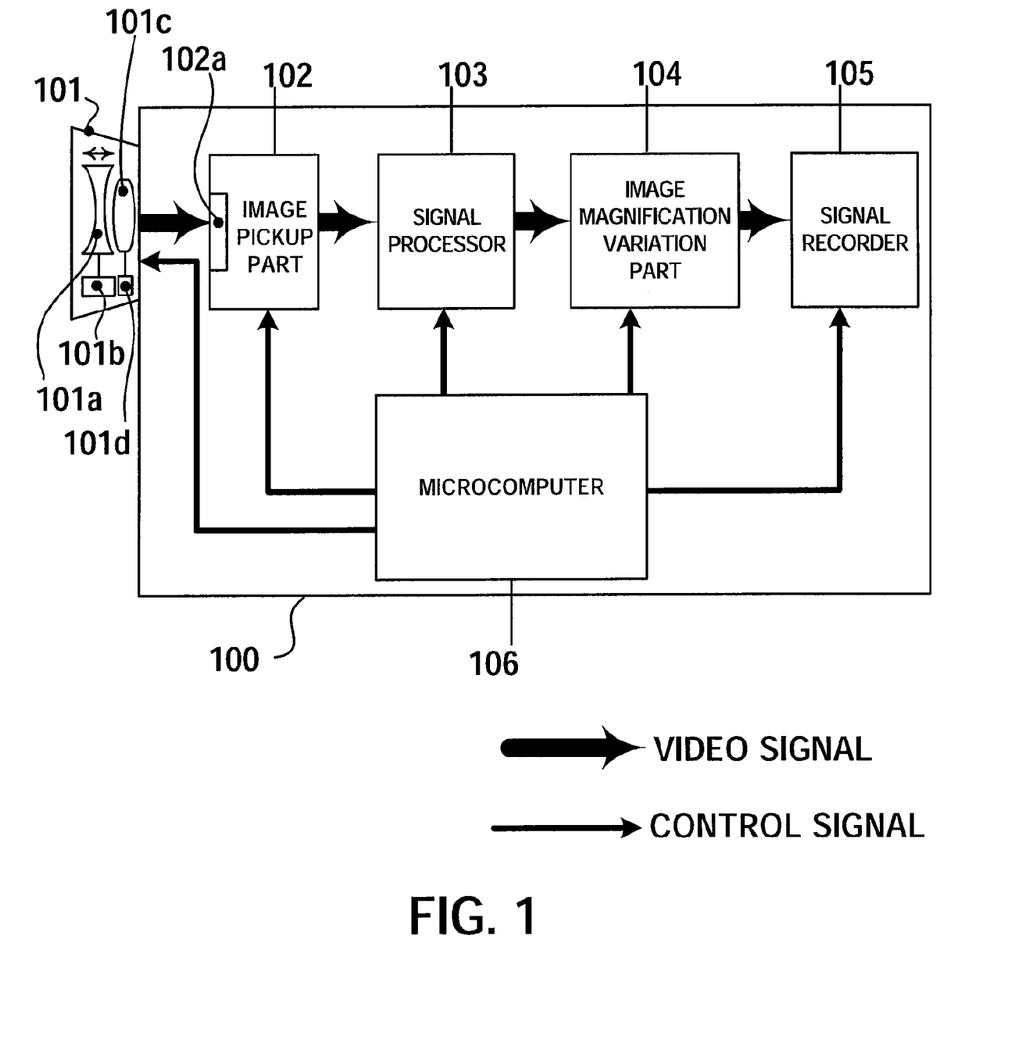
FIG. 1 is a block diagram showing a structure of an image pickup apparatus (video camera) according to a first embodiment of the present invention.

FIG. 1 shows a structure of a video camera 100 as an image pickup apparatus according to a first embodiment of the present invention. In FIG. 1, 101 denotes an optical system that includes a magnification-varying lens 101a, a focus lens 101c, a plurality of optical elements (not shown), such as a stop and a ND filter, and actuators and driving circuits configured to drive each of these optical elements. The magnification-varying lens 101a, the actuator and the driving circuit 101b configured to move the magnification-varying lens 101a constitute an optical zooming unit. The focus lens 101c that is located closer to the image pickup side than the magnification-varying lens 101a, the actuator and the driving circuit 101d configured to move the focus lens 101c constitute a focusing unit. In other words, the video camera 100 has a rear focus mechanism.

Figure 8:
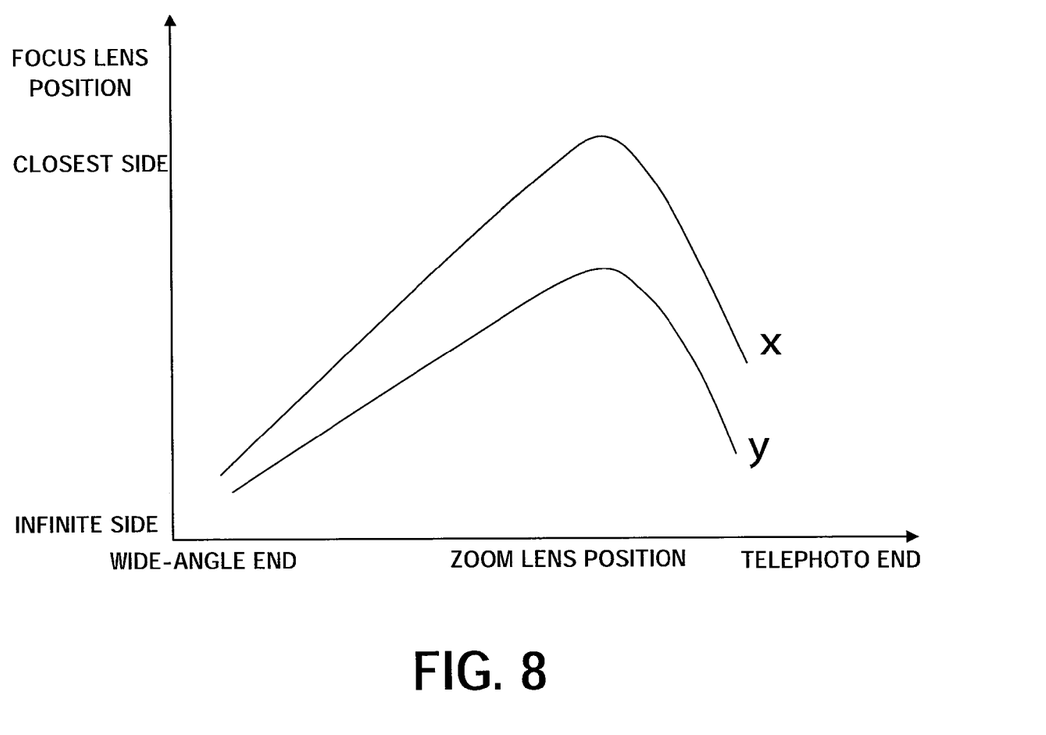
FIG. 8 is a view for explaining a cam locus.

The rear focus mechanism maintains a relationship between the focus lens 101c and the magnification-varying lens 101a, as shown in FIG. 8, and realizes focusing onto a subject distant by distances x and y. This relationship is expressed by the cam locus.

102 denotes an image pickup part that includes an image sensor such as a CCD sensor or a CMOS sensor, a sampling/holding (S/H) circuit, and a preprocess circuit. 103 is a signal processor. The image pickup part 102 and the signal processor 103 constitute an image pickup system.

104 denotes an image magnification variation part as an electronic zooming unit, which cuts out an image area having a pixel number corresponding to an electronic zoom magnification from an original image generated by the image pickup system (signal processor 103), as shown in FIGS. 6A to 6D, and outputs the image area as it is or after converting or reducing it into an image having a predetermined pixel number. The image having this predetermined pixel number is a record image.

105 denotes a signal recorder, which records the record image output from the image magnification variation part 104 into a recording medium, such as a flash memory, an optical disc, and a magnetic tape.

106 denotes a microcomputer that serves as a controller, which controls the whole operation of the video camera 100.

The microcomputer 106 obtains a command value of a zoom magnification designated by a user when the user manipulates a zoom switch (not shown). In addition, the microcomputer 106 determines a position of the magnification-varying lens 101a or a zoom magnification of the optical system 101 (which will be referred to as an "optical zoom magnification" hereinafter) according to the command value, and a zoom magnification of the image magnification variation part 104 (which will be referred to as an "electronic zoom magnification" hereinafter), and sends them to the optical system 101 and the image magnification variation part 104. The optical system 101 activates the actuator and moves the magnification-varying lens 101a to a position sent by the microcomputer 106. Thereby, the optical zooming that is an optical magnification variation is performed.

The microcomputer 106 adjusts the light quantity from the subject incident upon the image sensor 102 from the optical system 101 by driving the stop and the ND filter.

The image pickup part 102 forms a subject image on a imaging surface of the image sensor 102a through the light from the subject, and the subject image is photoelectrically converted into an electric signal by the image sensor 102a for storage and output. The electric signal output from the image sensor 102a undergoes the sampling and holding process at the S/H circuit, and is supplied to the preprocess circuit. The preprocess circuit provides an automatic gain control ("AGC") process, a black balance process, a white balance process, and a gamma correction process, or the like to the electric signal from the S/H circuit.

The signal processor 103 provides a process, such as a treatment and a correction, to the electric signal output from the preprocess circuit based on an instruction from the microcomputer 106, and generates an original image as a video signal. The original image is output to the image magnification variation part 104.

The image magnification variation part 104 performs the above process for the original image according to the electronic zoom magnification instructed by the microcomputer 106, and generates a record image as a video image to be recorded. Thereby, the electronic zooming that is an electronic magnification variation is performed.

The microcomputer 106 of this embodiment has an optical/electronic synthesis zoom function that makes the image magnification variation part 104 provide the electronic zooming through along with or connected to the optical zooming in the optical system 101. In other words, the optical/electronic synthesis zoom control is performed which controls the electronic zoom magnification according to a change of the optical zoom magnification.

The signal recorder 105 records the record image output from the image magnification variation part 104 into a recording medium after processing and converting the record image into a format suitable for the recording medium.

A Change of the Electronic Zoom Magnification Along with a Change of the Optical Zoom Magnification FIGS. 6A to 6D show an image cutout process to change the electronic zoom magnification along with a change of the optical zoom magnification. This process cuts a partial image area out of the image (which will be referred to as an "original image" hereinafter) generated through a photoelectric conversion process of the subject image, and converts the partial image area into an image having a specific pixel size for recording and reproducing.

Assume that the original image has a size of 1,200 pixels× 900 pixels, and the image recorder of the image pickup apparatus records an image having a size of 640 pixels×480 pixels.

Figure 2:
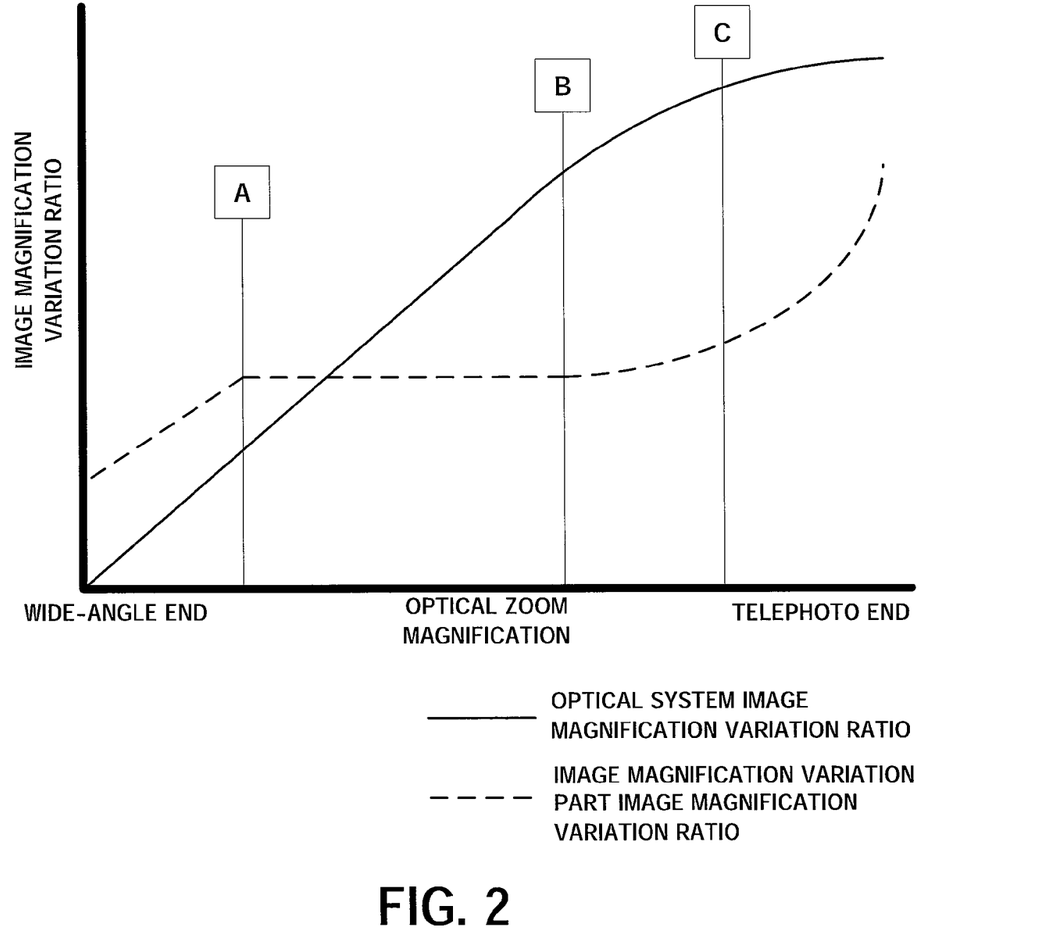
FIG. 2 is a view showing a relationship between the optical zoom magnification and the electronic zoom magnification in the image pickup apparatus according to the first embodiment.
Figure 6A:
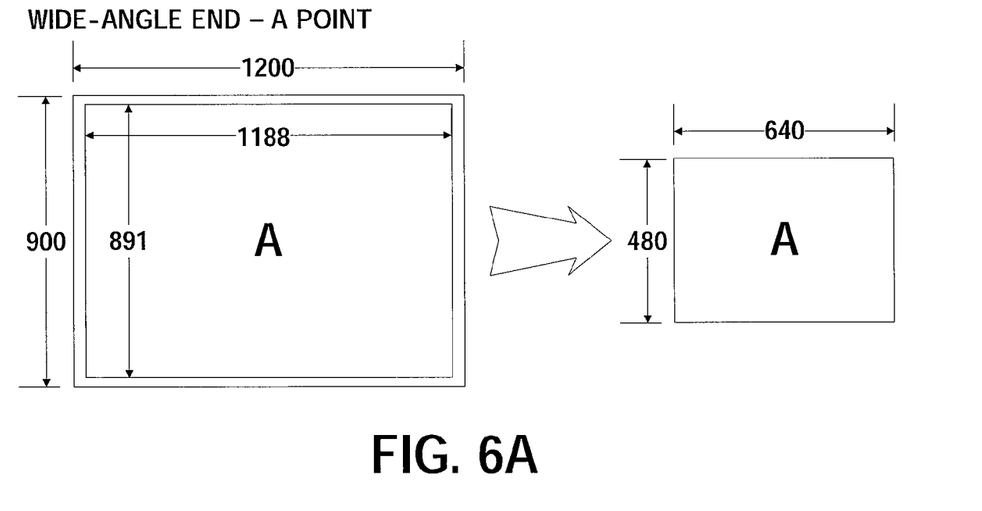
FIG. 6A is a schematic view showing electronic zooming (between the wide-angle end and a magnification A) in the image pickup apparatus according to this embodiment.

When the optical zoom magnification is set to a magnification between the wide-angle end and a magnification A shown in FIG. 2, the image area of 1,188 pixels×891 pixels is cut out of the original image having 1,200 pixels×900 pixels, and reduced down to 640 pixels×480 pixels for recording. The cutout image area is smaller than the original image so as to maintain a latitude amount for the image stabilization process that reduces a vibration of an image caused by a manual vibration. The vibration of the image to be recorded or displayed is reduced by offsetting the cutout image area according to the manual vibration. The small number of pixels is set to the image stabilization latitude amount near the wide-angle area at which the vibration of the image caused by the manual vibration is less conspicuous.

Figure 6B:
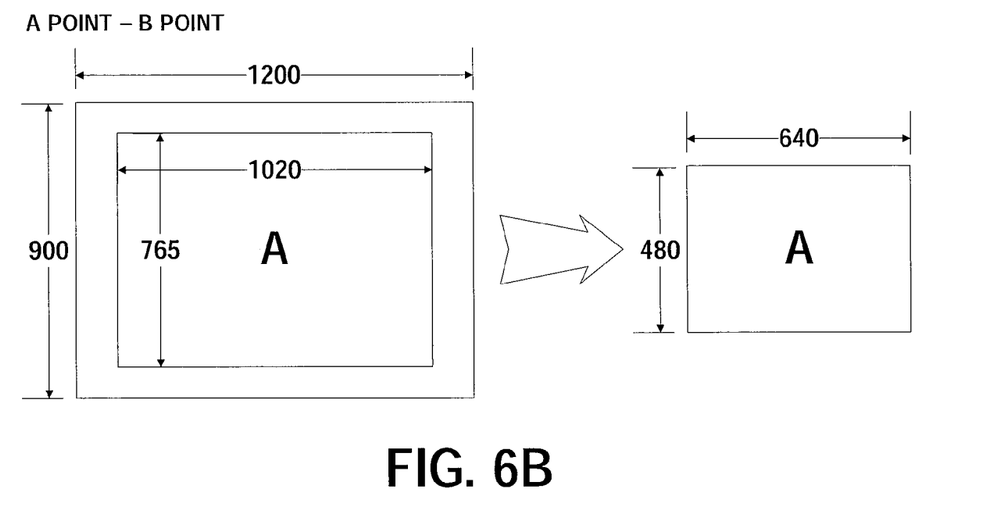
FIG. 6B is a schematic view showing electronic zooming (between the magnification A and a magnification B) in the image pickup apparatus according to this embodiment.

When the optical zoom magnification is set between the magnification A and a magnification B in FIG. 2, an image area having 1,020 pixels×765 pixels is cut out of the original image having 1,200 pixels×900 pixels, and reduced down to 640 pixels×480 pixels for recording. The magnification A is a magnification at which the vibration of the image caused by the manual vibration starts to be conspicuous, and thus the sufficiently large number of pixels is set to the image stabilization latitude amount. This cutout area discretely changes according to a change of the optical zoom magnification.

The number of cutout pixels is set constant between the magnification A and the magnification B, because the reduction of the number of cutout pixels results in the degraded resolution of the record image. Therefore, the magnification B can be set closer to the telephoto end.

Figure 6C:
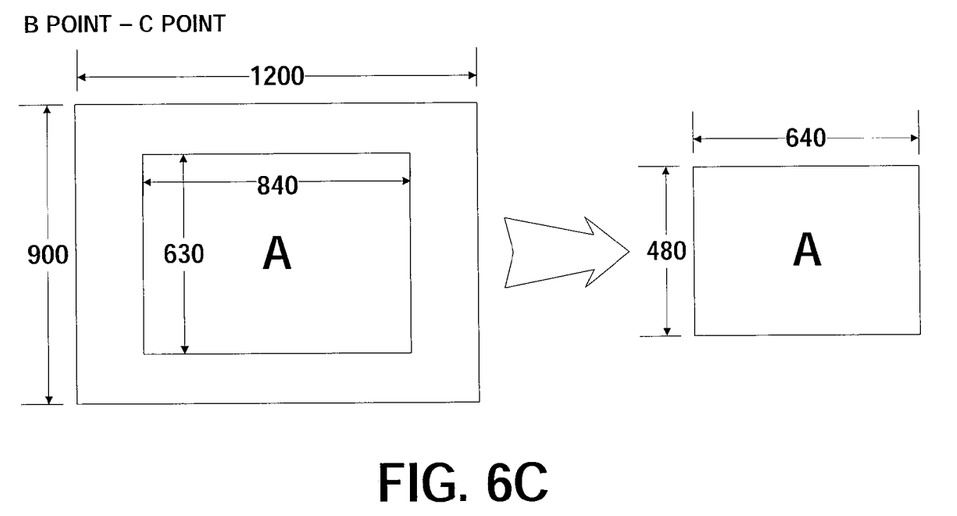
FIG. 6C is a schematic view showing electronic zooming (between the magnification B and a magnification C) in the image pickup apparatus according to this embodiment.

When the optical zoom magnification is set between the magnification B and a magnification C in FIG. 2, an image area having 840 pixels×630 pixels is cut out of an original image having 1,200 pixels×900 pixels, and reduced down to 640 pixels×480 pixels for recording. This cutout area discretely changes according to a change of the optical zoom magnification.

Figure 6D:
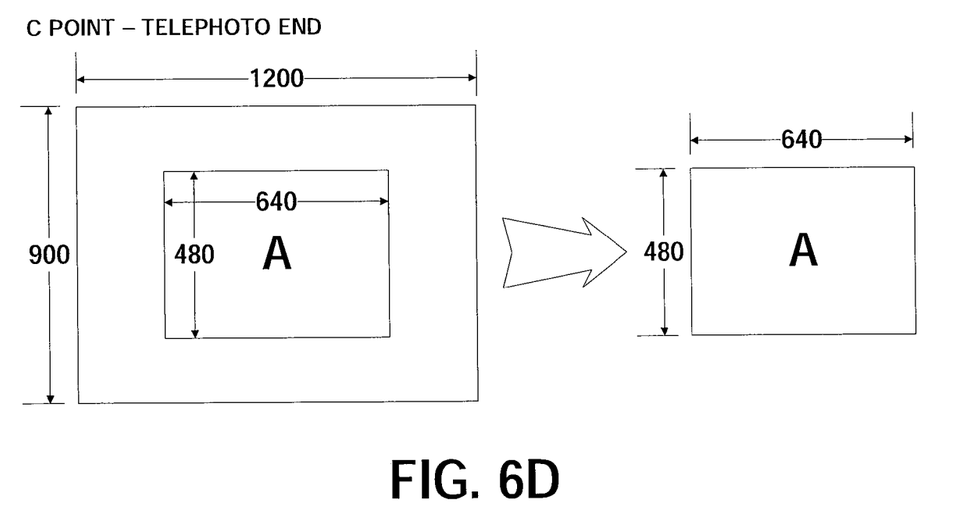
FIG. 6D is a schematic view showing electronic zooming (between the magnification C and a magnification D) in the image pickup apparatus according to this embodiment.

When the optical zoom magnification is set between the magnification C and the telephoto end, an image area having 640 pixels×480 pixels is cut out of the original image having 1,200 pixels×900 pixels, and recorded as it is. This cutout area discretely changes according to the change of the optical zoom magnification.

This optical/electronic synthesis zoom function provides a high zoom performance that is unavailable only with the optical zooming, without degrading the image quality caused by the electronic image enlargement process that is performed in conventional electronic zooming.

As described above, the cutout area of the electronic zooming discretely changes according to a change of the optical zoom magnification, because the resolution of a change of the electronic zoom magnification is lower than that of a change of the optical zoom magnification.

Optical Zoom Magnification and Electronic Zoom Magnification

Figure 5:
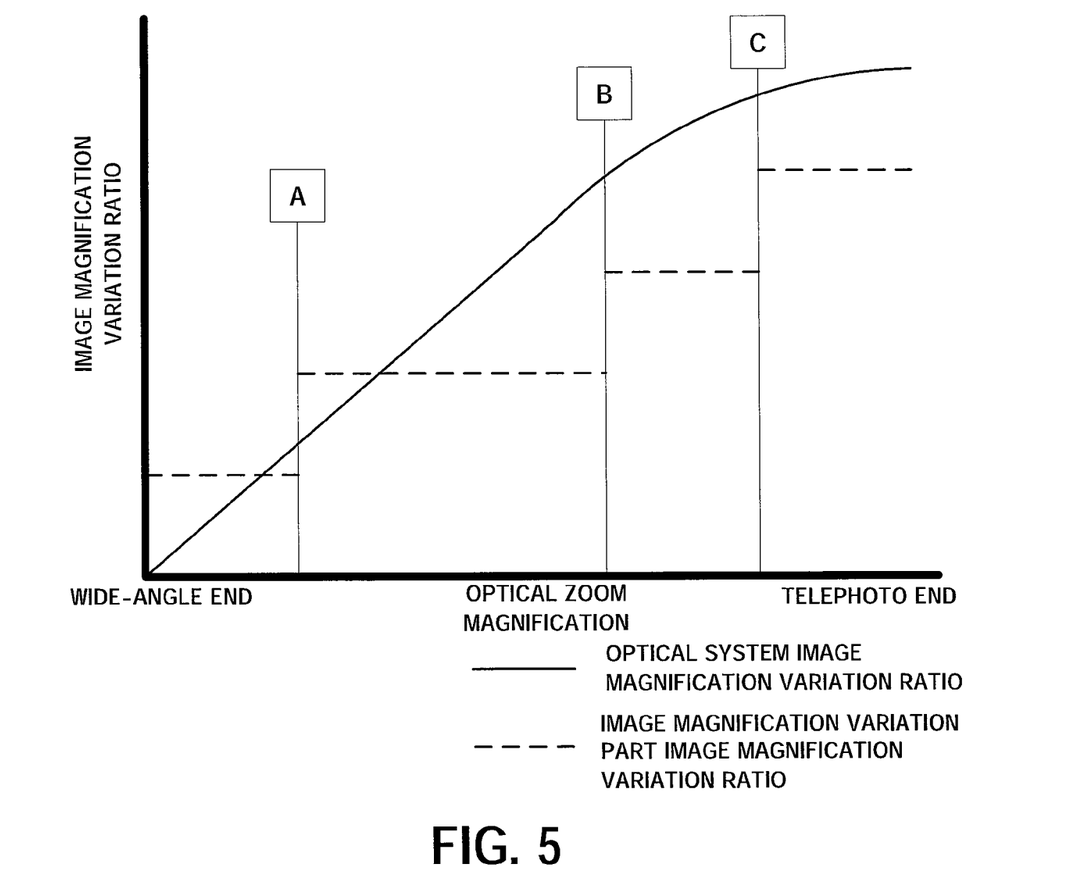
FIG. 5 is a view showing a relationship between the optical zoom magnification and the electronic zoom magnification in the image pickup apparatus according to the comparative example.

FIG. 2 shows a relationship between the optical zoom magnification and the electronic zoom magnification in the optical/electronic synthesis zoom control in the microcomputer 106 (which is shown as an "image magnification variation ratio" in the drawing). FIG. 5 is a view used for a comparison with FIG. 2.

When the optical zoom magnification in a wide-angle-side zoom region (second zoom region) is increased from the wide-angle end to the magnification A, the electronic zoom magnification (image magnification variation ratio) is discretely increased along with the increase of the optical zoom magnification. Conversely, when the optical zoom magnification is decreased in the wide-angle-side zoom region, the electronic zoom magnification is discretely decreased along with the decrease of the optical zoom magnification. The continuous increase or decrease (change) may be a curvilinear or linear change as illustrated so as to compensate the fluctuation of an angle of view caused by the optical zooming.

Thus, the electronic zoom magnification in the wide-angle zoom region discretely changes from the electronic zoom magnification (predetermined zoom magnification) corresponding to the optical zoom magnification A to the electronic zoom magnification corresponding to the optical wide-angle end that is different from or lower than the optical zoom magnification A.

The discrete increase and decrease of the electronic zoom magnification is performed by discretely increasing or decreasing the number of cutout pixels from the original pixels described with reference to FIGS. 6A to 6D.

When the optical zoom magnification is increased or decreased in a middle zoom region (first zoom region) between the magnification A and the magnification B, the electronic zoom magnification is fixed or maintained to the electronic zoom magnification corresponding to the optical zoom magnification A. In other words, only the optical zoom magnification is allowed to change without changing the electronic zoom magnification or by maintaining constant the electronic zoom magnification. Thereby, the degraded resolution of the record image which would otherwise be caused by the electronic zooming can be prevented in the middle zoom region.

Moreover, when the optical zoom magnification is increased in a telephoto-side zoom region (third zoom region) between the magnification B and the telephoto end beyond the magnification C, the electronic zoom magnification is discretely increased along with the increase of the optical zoom magnification. Conversely, when the optical zoom magnification is decreased in the telephoto-side zoom region, the electronic zoom magnification is discretely decreased along with the decrease of the optical zoom magnification.

Thus, the electronic zoom magnification in the telephoto-side zoom region discretely changes from the electronic zoom magnification (predetermined zoom magnification) corresponding to the optical zoom magnification B (A) to the electronic zoom magnification corresponding to the optical telephoto end that is different from or higher than the optical zoom magnification B (A).

In this way, in moving from the first zoom region to the second zoom region that is closer to the wide-angle side, this embodiment discretely provides the electronic zooming along with the optical zooming at a first change rate. Moreover, in moving from the first zoom region to the third zoom region that is closer to the telephoto side than the first zoom region, this embodiment discretely provides the electronic zooming along with the optical zooming at a second change rate that is smaller than the first change rate. Thereby, even when the optical zooming is performed between the wide-angle end and the telephoto end, the synthesis magnification between the optical zoom magnification and the electronic zoom magnification (which will be referred to as a "synthesis zoom magnification" hereinafter) does not abruptly change, and a smooth optical/electronic zoom control or change of an angle of view of the record image can be provided.

A change rate (increase rate) of the optical zoom magnification in a zoom region between the optical zoom magnification C and the telephoto end is made smaller at a position closer to the telephoto end so as to avoid a delay of the movement control of the focus lens configured to correct a displacement of an image surface of the optical system 101 relative to a changing speed of the synthesis zoom magnification and to maintain the on-focus state upon the subject, or to maintain the focus follow-up performance to the change of the zoom magnification.

In the zoom region from the optical zoom magnification C to the telephoto end, this embodiment makes higher the change rate (increase rate) of the electronic zoom magnification at a position closer to the telephoto end, similar to the region between the optical zoom magnifications B and C, so as to compensate the reduction of the change rate of the optical zoom magnification. In addition, the focus lens 101c is driven to a position that is pursuant to the cam locus described with reference to FIG. 8. Thereby, the image pickup apparatus having the rear focus mechanism can maintain a uniform zoom speed from the wide-angle end to the telephoto end, and provide a good zoom manipulation touch to a user.

Change of Angle of View

Figure 3:
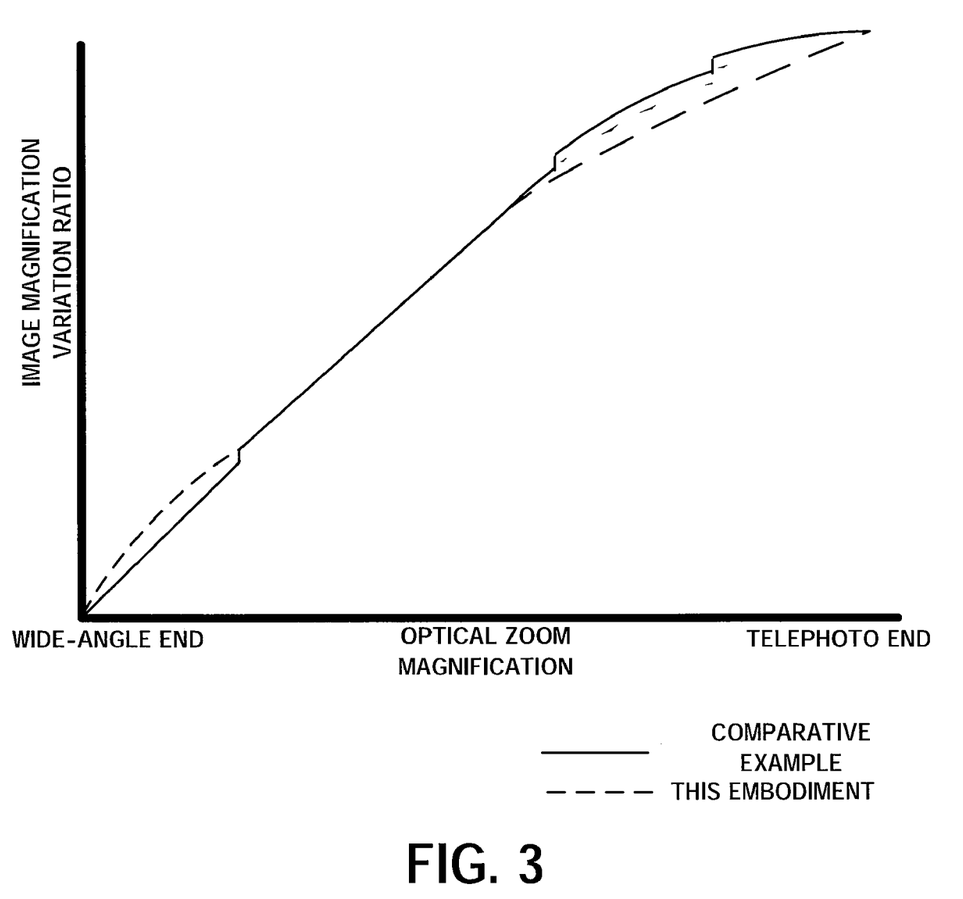
FIG. 3 is a view showing a relationship between the optical zoom magnification and the electronic zoom magnification according to the first embodiment and a relationship between the optical zoom magnification and the electronic zoom magnification according to a comparative example.

FIG. 3 illustrates a comparison of changing states between the optical zoom magnification and the electronic zoom magnification in the optical/electronic synthesis zoom control according to the comparison example shown in FIG. 5 with that according to this embodiment. As shown by a solid line in FIG. 3, when the electronic zoom magnification is stepwise changed along with a change of the optical zoom magnification, an abrupt change of an angle of view (step) occurs in the record image.

On the other hand, as shown by a dotted line in FIG. 3, this embodiment discretely changes or maintains constant the electronic zoom magnification along with a change of the optical zoom magnification, the change of the angle of view has no step, providing a smooth change of an angle of view.

Flow

Figure 4:
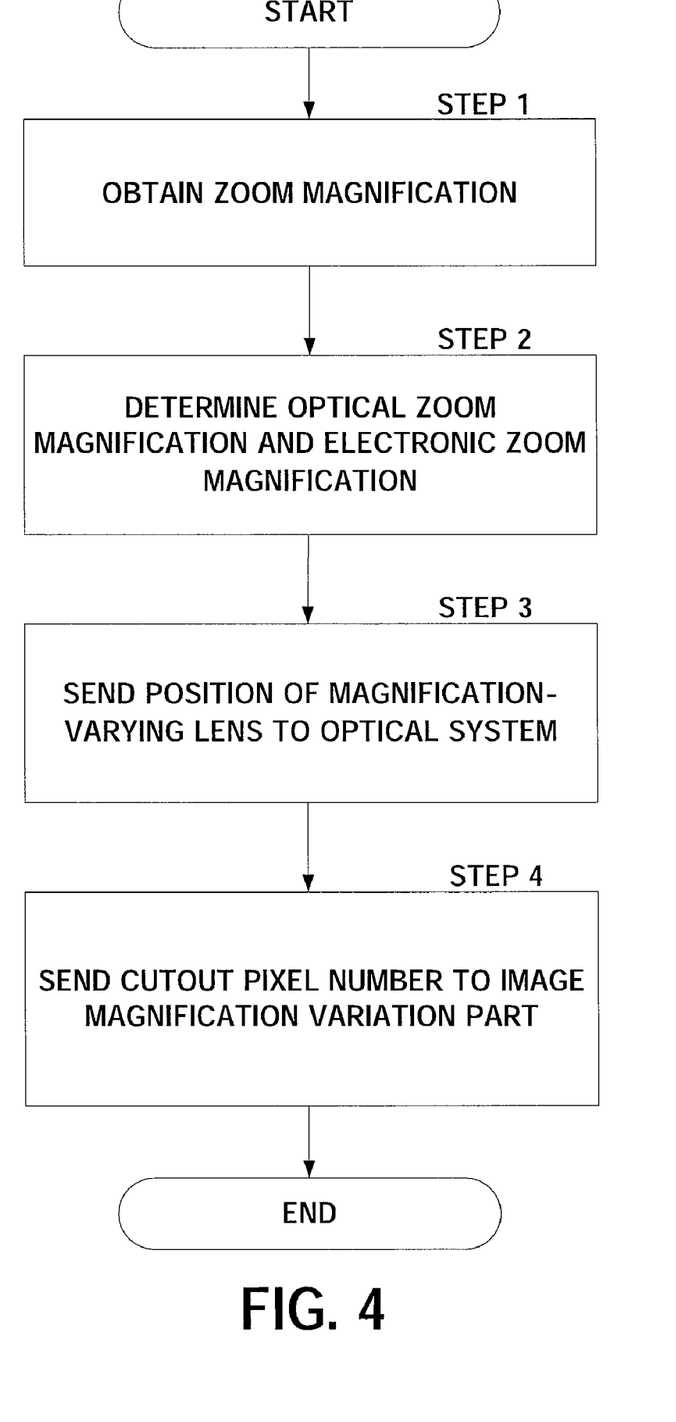
FIG. 4 is a flowchart showing optical/electronic synthesis control in an image pickup apparatus according to the first embodiment.

The flowchart shown in FIG. 4 shows an operation of the optical/electronic synthesis zoom control by the microcomputer 106 according to this embodiment. This operation is executed in accordance with a computer program stored in the microcomputer 106.

In the Step 1, the microcomputer 106 obtains a zoom magnification (corresponding to the synthesis zoom magnification) designated by a user's manipulation of the zoom switch.

Next, in the Step 2, the microcomputer 106 determines the optical zoom magnification and the electronic magnification by using the obtained zoom magnification as an index, and by referring to a data table that stores a relationship between the optical zoom magnification and the electronic zoom magnification shown in FIG. 2.

Alternatively, the data table may store a relationship between the position of the magnification-varying lens 101a and the aforementioned cutout pixel number, and the magnification-varying lens's position and the cutout pixel number as information corresponding to the optical zoom magnification and the electronic zoom magnification may be determined. In addition, without using the data table, the optical zoom magnification and the electronic zoom magnification (or the magnification-varying lens's position and the cutout pixel number) may be calculated by using an operational equation according to the designated zoom magnification.

Next, in the Step 3, the microcomputer 106 sends to the driving circuit for the magnification-varying lens in the optical system 101 a position of the magnification-varying lens 101a corresponding to the optical zoom magnification determined in the Step 2. Thereby, the magnification-varying lens 101a is driven to the sent position. In addition, the focus lens 101c is driven to a position in accordance with the cam locus described in FIG. 8.

Next, in the Step 4, the microcomputer 106 sends to the image magnification variation part 104 the cutout pixel number corresponding to the electronic zoom magnification determined in the Step 2. The image magnification variation part 104 cuts out a part of the original image by using the sent cutout pixel number, performs any necessary pixel number conversion, and outputs the result to the signal recorder 105. Thus, the optical zooming and the electronic zooming are performed in association, and finally the zoom magnification obtained in the Step 1 can be obtained.

Thus, this embodiment can obtain a high quality record image that does not contain an abrupt change of an angle of view by using the optical/electronic synthesis zoom control in the rear focus mechanism. Moreover, a zoom speed between the wide-angle end and the telephoto end can be made uniform, and a user is provided with a comfortable zoom manipulation touch.

Second Embodiment

Figure 7:
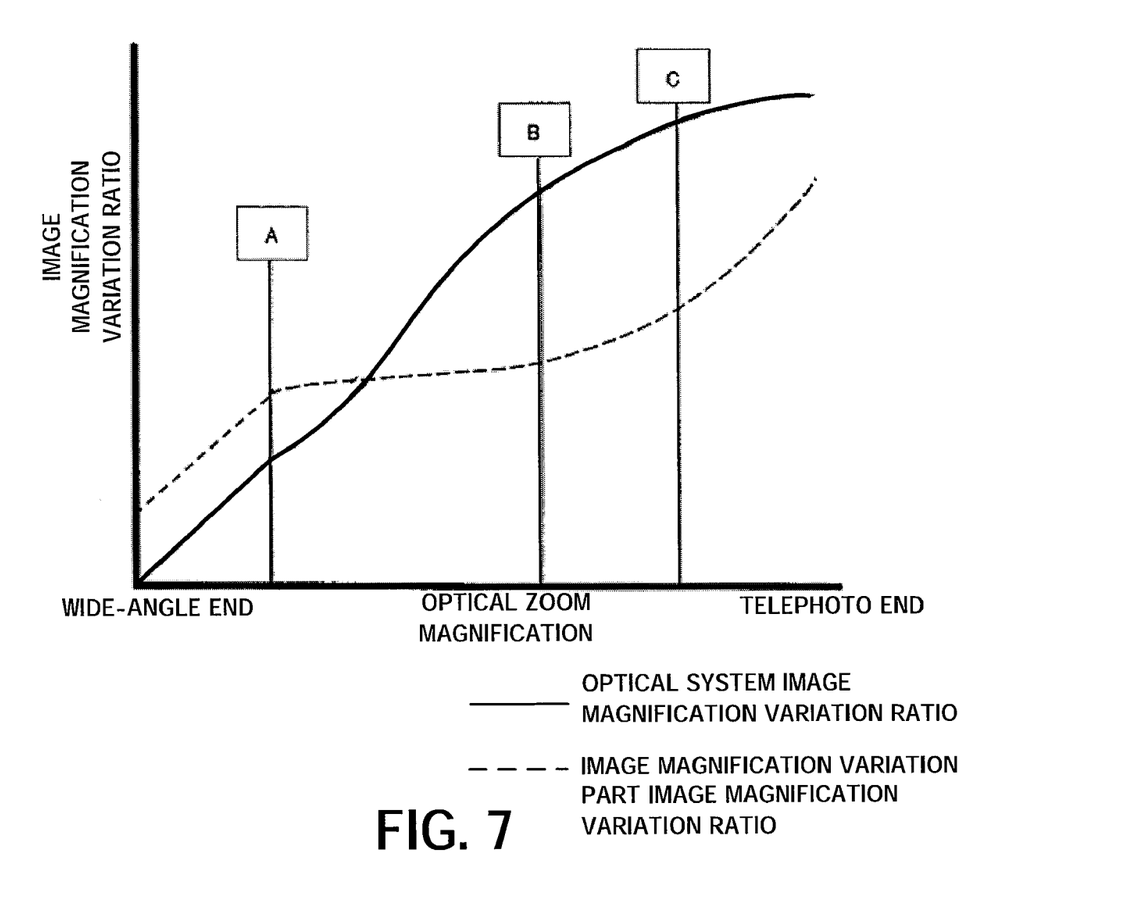
FIG. 7 is a view showing a relationship between the optical zoom magnification and the electronic zoom magnification according to a second embodiment of the present invention and a relationship between the optical zoom magnification and the electronic zoom magnification according to prior art.

FIG. 7 shows a relationship between the optical zoom magnification and the electronic zoom magnification in the optical/electronic synthesis zoom control (which is shown as the "image magnification variation ratio" in the drawing) in the video camera according to a second embodiment of the present invention which is a variation of the first embodiment.

When the optical zoom magnification changes (increases or decreases) in a middle zoom region (first zoom region) between the magnification A and the magnification B, the electronic zoom magnification (image magnification variation ratio) is changed (increased or decreased) at a moderate first change rate. The "first change rate," as used herein, may be constant or variable. Thereby, the degraded resolution of the record image which would otherwise be caused by the electronic zooming can be avoided in the middle zoom region.

When the optical zoom magnification changes (increases or decreases) in the wide-angle-side zoom region (second zoom region) between the wide-angle end and the magnification A, the electronic zoom magnification is discretely changed (increased or decreased) along with a change of the optical zoom magnification at a rate (second change rate) which is larger than the first change rate. The "discrete change," as used herein, may be a curvilinear change as illustrated or a linear change so as to compensate the fluctuation of the angle of view which is caused by the optical zooming.

When the optical zoom magnification changes (increases or decreases) in a telephoto-side zoom region (third zoom region) between the magnification B and the telephoto end beyond the magnification C, the electronic zoom magnification is discretely changed (increased or decreased) along with a change of the optical zoom magnification at a rate (third change rate) that is larger than the first change rate.

Thus, this embodiment discretely sets the electronic zoom magnification to a continuous value with no step along with the change of the optical zoom magnification between the wide-angle end and the telephoto end. Thereby, the synthesis magnification between the optical zoom magnification and the electronic zoom magnification does not abruptly change even when the optical zooming is performed between the wide-angle end and the telephoto end, a smooth optical/electronic synthesis zoom control or a change of an angle of view of the record image can be provided.

This embodiment also makes larger the change rate (increase rate) of the electronic zoom magnification at a position closer to the telephoto end so as to compensate the reduction of the change rate of the optical zoom magnification in the zoom region from the optical zoom magnification C to the telephoto end. Thereby, a uniform zoom speed can be obtained from the wide-angle end to the telephoto end, and provides a user with a comfortable zoom manipulation touch.

The operation of the microcomputer 106 in the optical/electronic synthesis zoom control of this embodiment is similar to that described in the first embodiment (FIG. 4), and a description thereof will be omitted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, while the above embodiments discuss the video camera, the present invention is applicable to another image pickup apparatus, such as a digital still camera.

This application claims the benefit of Japanese Patent Application No. 2007-341312, filed on Dec. 28, 2007, which is hereby incorporated by reference herein in its entirety.

What is claimed is:

1. An image pickup apparatus comprising:
    an optical zooming unit configured to provide an optical magnification variation by using a rear focus mechanism;

an electronic zooming unit configured to provide an electronic magnification variation; and a controller configured to discretely control an operation of the electronic zooming unit along with an operation of the optical zooming unit by using at least a first change rate or a second change rate smaller than the first change rate, wherein when the optical zooming unit moves from a first zoom region to a second zoom region that is closer to a wide-angle end than the first zoom region, the controller discretely moves the electronic zooming unit along with the operation of the optical zooming unit at the first change rate, and when the optical zooming unit moves from the first zoom region to a third zoom region that is closer to a telephoto end than the first zoom region, the controller discretely operates the electronic zooming unit along with the operation of the optical zooming unit at the second change rate;

wherein the controller maintains a zoom magnification of the electronic zooming unit at a predetermined value when the optical zooming unit operates in the first zoom region.

2. An image pickup apparatus according to claim 1, wherein when the optical zooming unit operates in the first zoom region, the controller changes a zoom magnification of the electronic zooming unit at the first change rate, wherein when the optical zooming unit operates in the second zoom region, the controller changes the zoom magnification of the electronic zooming unit at the second change rate that is smaller than the first change rate, and wherein when the optical zooming unit operates in the third zoom region, the controller changes the zoom magnification of the electronic zooming unit at a third change rate that is larger than the first change rate.

3. An image pickup apparatus according to claim 1, wherein the controller makes smaller a change rate of the zoom magnification of the optical zooming unit at a position closer to a telephoto end in the third zoom region.

4. An image pickup apparatus according to claim 1, wherein the controller makes larger a change rate of the zoom magnification of the electronic zooming unit at a position closer to a telephoto end in the third zoom region.

5. A control method for an image pickup apparatus that includes an optical zooming unit configured to provide an optical magnification variation by using a rear focus mechanism, an electronic zooming unit configured to provide an electronic magnification variation, and a controller configured to discretely control an operation of the electronic zooming unit along with an operation of the optical zooming unit by using at least a first change rate and a second change rate smaller than the first change rate, said method comprising the steps of:

discretely moving, when the optical zooming unit moves from a first zoom region to a second zoom region that is closer to a wide-angle end than the first zoom region, the electronic zooming unit along with the operation of the optical zooming unit at the first change rate, wherein the controller maintains a zoom magnification of the electronic zooming unit at a predetermined value when the optical zooming unit operates in the first zoom region; and discretely operating, when the optical zooming unit moves from the first zoom region to a third zoom region that is closer to a telephoto end than the first zoom region, the electronic zooming unit along with the operation of the optical zooming unit at the second change rate.

* * * * *